(12) United States Patent
Tuoriniemi

(10) Patent No.: US 6,444,307 B1
(45) Date of Patent: Sep. 3, 2002

(54) MASKING TAPE

(76) Inventor: Veijo M. Tuoriniemi, 50 Horatio St., #16, New York, NY (US) 10014-1675

( * ) Notice: Subject to any disclaimer, the term of this patent is extended or adjusted under 35 U.S.C. 154(b) by 0 days.

(21) Appl. No.: 09/402,759

(22) PCT Filed: Dec. 31, 1998

(86) PCT No.: PCT/US98/27891
§ 371 (c)(1),
(2), (4) Date: Oct. 12, 1999

(87) PCT Pub. No.: WO99/48618
PCT Pub. Date: Sep. 30, 1999

Related U.S. Application Data
(60) Provisional application No. 60/070,260, filed on Dec. 31, 1997.

(51) Int. Cl.$^7$ .............................. C09J 7/02; B32B 7/12; B32B 3/02; B05D 1/32
(52) U.S. Cl. ....................... 428/343; 428/40.1; 428/121; 428/124; 428/194; 428/354; 428/906; 118/504; 118/505; 427/208.4
(58) Field of Search .................. 428/40.1, 121, 428/124, 194, 343, 352, 354, 906; 118/504, 505; 427/208.4, 282

(56) References Cited

U.S. PATENT DOCUMENTS

| | | | | | |
|---|---|---|---|---|---|
| 3,032,181 | A | * | 5/1962 | Hutter et al. | 206/59 |
| 4,263,347 | A | * | 4/1981 | Banta | 427/282 |
| 4,889,759 | A | * | 12/1989 | Yamazaki | 428/181 |
| 5,049,445 | A | * | 9/1991 | Arvidsson et al. | 428/352 |
| 5,354,614 | A | * | 10/1994 | Cox et al. | 428/343 |
| 5,464,692 | A | * | 11/1995 | Huber | 428/343 |
| 5,776,572 | A | * | 7/1998 | Lipson | 428/40.1 |
| 5,786,028 | A | * | 7/1998 | Cantwell | 427/282 |

\* cited by examiner

*Primary Examiner*—Daniel Zirker
(74) *Attorney, Agent, or Firm*—Charles E. Bruzga

(57) ABSTRACT

A window (26) is masked accurately by placing the side (44) of a tape roll (42) against a window frame (28) and pressing the outer rim (46) of the tape roll (42) against the window (26). Pressure bonds the adhesive (22a) to the window (26). The side (44) of the tape roll (42) is guided and supported against the window frame (28) and tape (100) is simultaneously unwound against the window (26). The outer longitudinal periphery of the tape (100) accurately follows the corner (36).

19 Claims, 19 Drawing Sheets

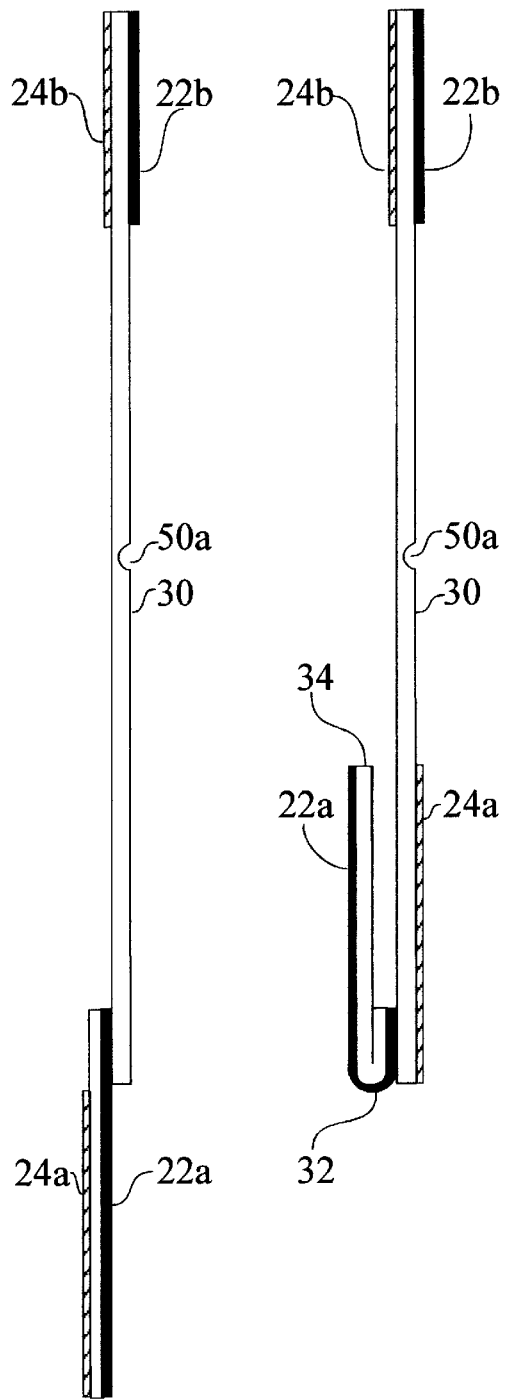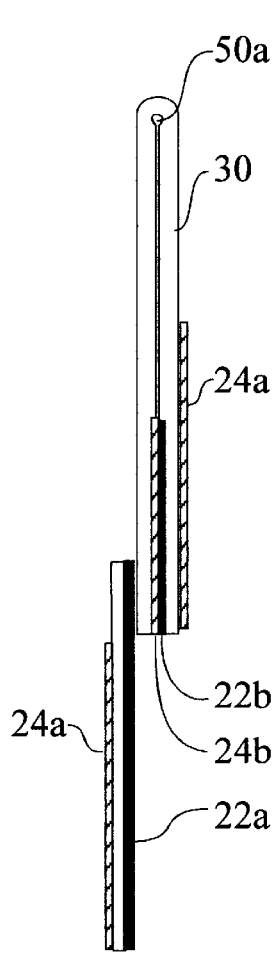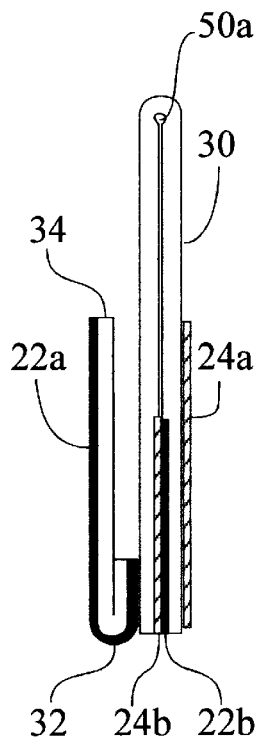
Fig. 9a  Fig. 9b  Fig. 9c  Fig. 9d

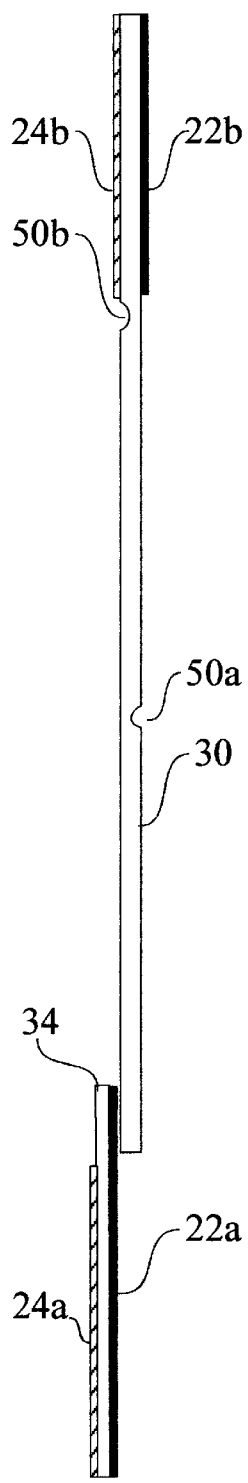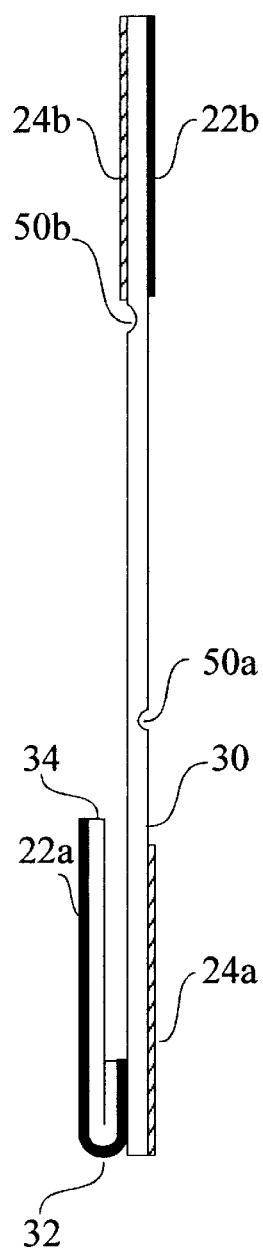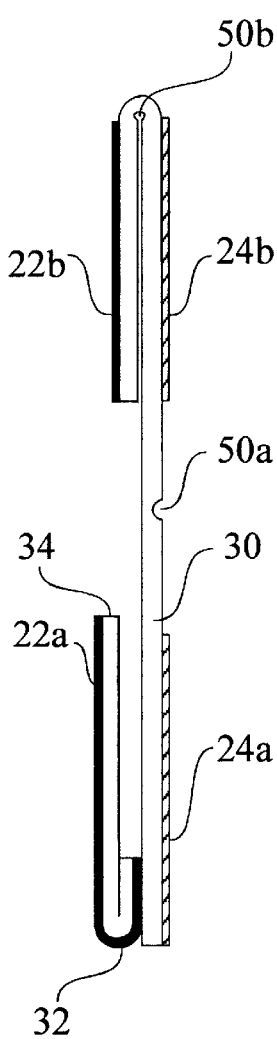

Fig. 16a
Fig. 16b
Fig. 16c
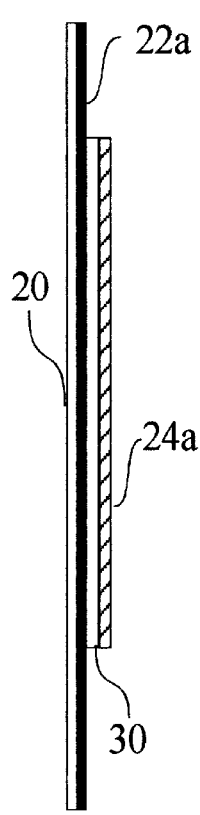
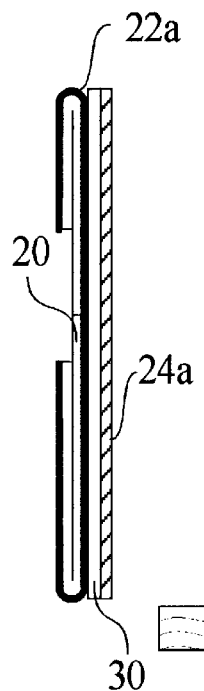
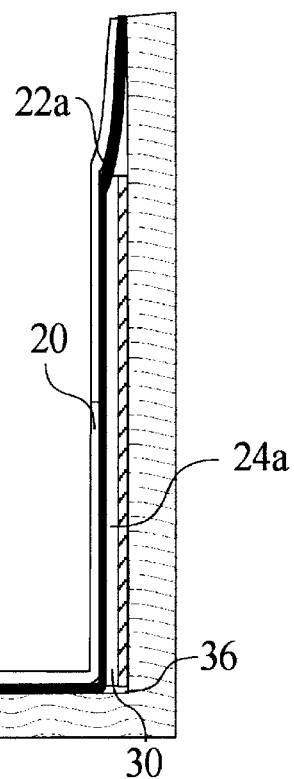
Fig. 16d
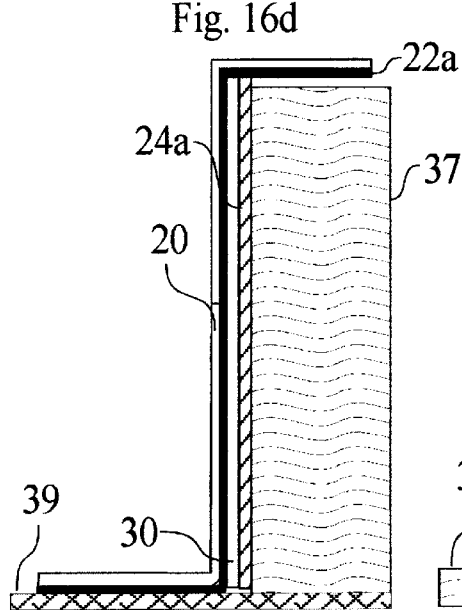
Fig. 16e
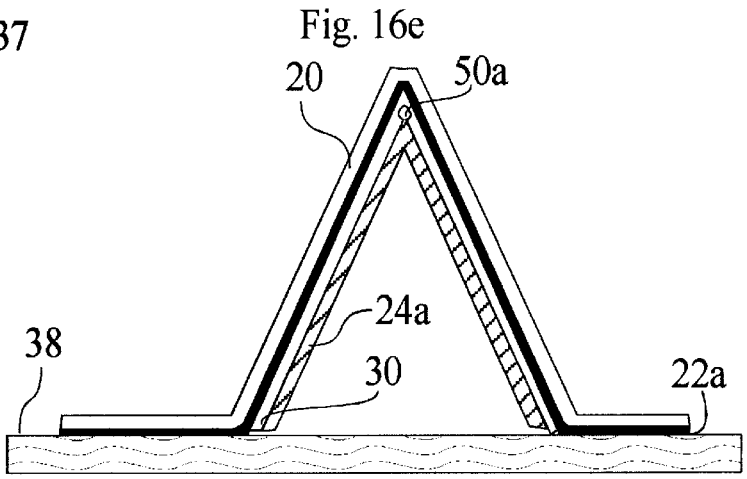

MASKING TAPE

This application claims priority from provisional application Serial No. 60/070,260 filed on Dec. 31 1997.

BACKGROUND—Field of Invention

This invention relates to masking tapes.

BACKGROUND—Prior Art

Lint removers having a adhesive outermost layer facing out of the roll are disclosed in U.S. Pat. No. 4,427,726 for Wolfrum, U.S. Pat. No. 4,546,011 for Wolfrum, U.S. Pat. No. 4,905.337 for McKay and U.S. Pat. No. 5,388,300 for Hickey. Lint removers are used to clean garments or analogous purposes by rolling the tape roll along the surface. Tape has a tacky adhesive layer which bonds the lint and removes it from clothes. The adhesive also bonds the tape to the backing of the next circumferential layer on a roll is usually so hard that is difficult to pull away the outer used layer. Lint remover web is usually readily formed to uniformly spaced, dispensable perforated or other way weakened portions Embossed backings having a structured, reduced contact for pressure sensitive adhesive to adhere has been disclosed in U.S. Pat. No. 4,397,905 for Dettmer et al. Purpose of the structure is to provide an easy release for the adhesive when the tape is unwound from the roll.

Easy tearing film-backed masking tape is disclosed in U.S. Pat. No. 4,781,957 awarded to Josephine et al. This resembles conventional creped paper-backed masking tape, but because of closely spaced randomly disposed, crosswise embossed valleys, the tape can be torn cleanly with fingers.

U.S. Pat. No. 4,358,494 for Saburo et al. is a paper-backed tape having a widthwise-stretched film lap-sealed on first side of the paper. A polyethylene is extruded and coated on the side of said film to form a release layer. Adhesive layer is formed to the second side of the backing paper.

U.S. Pat. No. 4,889,759 for Yamazaki discloses a thin masking paper for spray painting with a tape fixed to the edge of the paper. This invention cannot be rolled on surface straight from the roll and needs a dispencer to supply the tape. The masking paper is thinner than the tape and cannot support itself in form.

U.S. Pat. No. 5,654,055 for Cox et al. disclosed a masking tape with stiffer edge which is used to insert the edge under a molding or gasket. Method of masking is different from current disclosure.

U.S. Pat. No. 4,582,737 for Torgerson shows a Double surfaced adhesive tape where two masking tapes are combined together adhesive side facing to reverse directions. This cannot be used to mask corners and protect both surfaces of the corners as a tape disclosed in this application.

A type of flexible tape is described in U.S. Pat. No. 5,464,692 granted to Mortimer. Tape is suitable to confirm to irregular curvatures and contours. However, the tape is unrolled a conventional way and patent does not disclose any time saving applying methods.

Different type of tapes have been invented, but the improvements have been made on the adhesive or the backing. Neither of these patents disclose a tape which can be applied on a surface by rolling it along the surface or where the pressure sensitive adhesive side faces out.

OBJECTS AND ADVANTAGES

This tape can be rolled off the roll more easily and also applied faster more accurately than conventional tapes without prior experience

DRAWING FIGURES

Figure 5A:
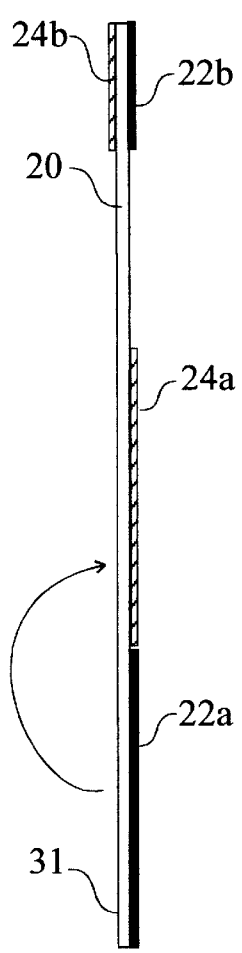
Figure 5B:
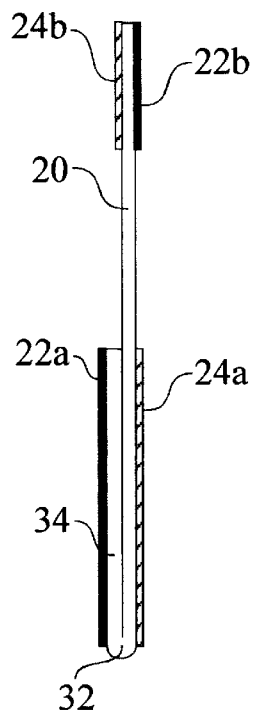
Figure 5C:
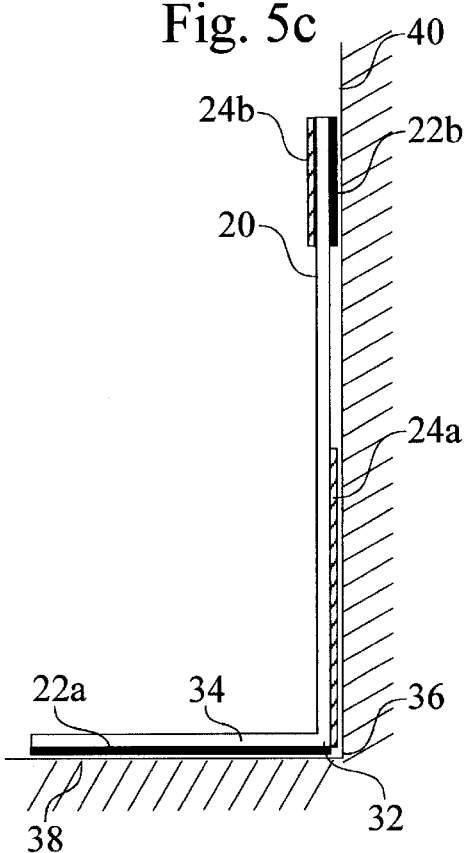
Figure 6A:
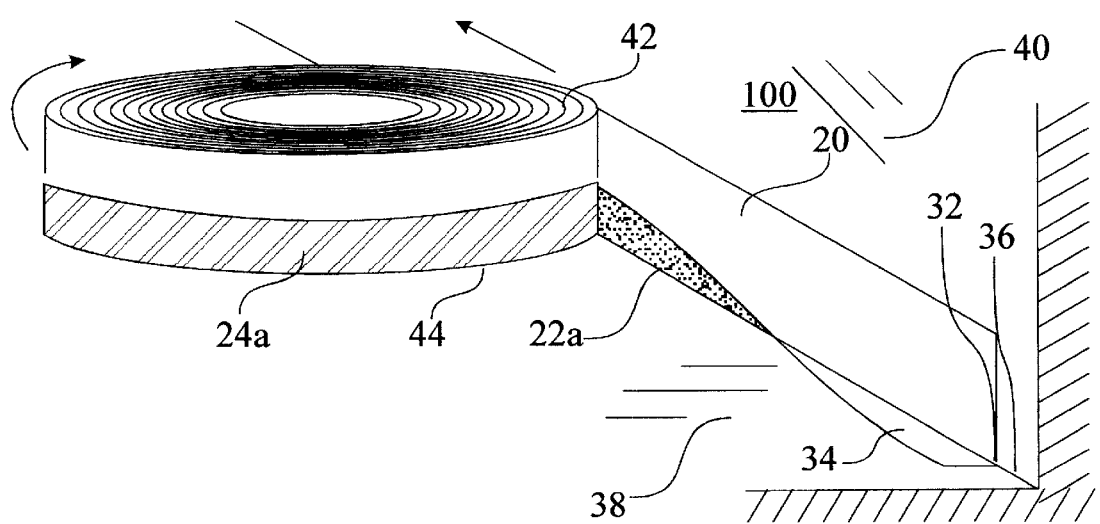

FIGS. 5a–c show the cross sectional view of the folded tape a) before folding, b) as folded and c) as unfolded against the working surface FIG. 6a shows the masking tape with inward pleat unwound, unfolded and bonded to a corner.

Figure 6B:
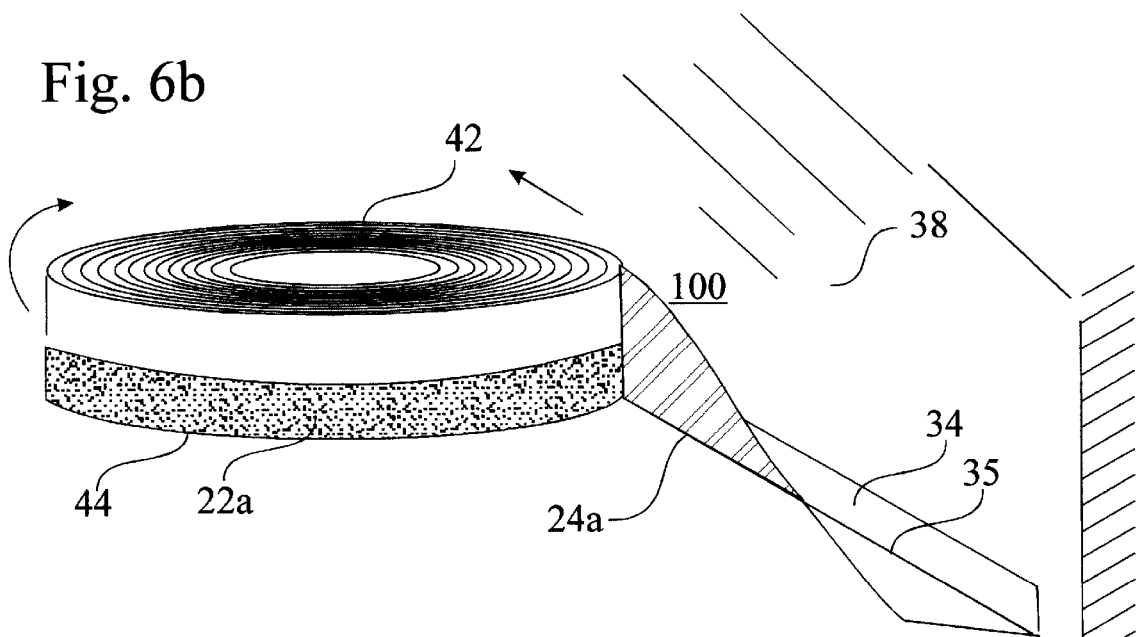

FIG. 6b shows the masking tape with outward pleat unwound, unfolded and bonded to a planar vertical surface.

Figure 6C:
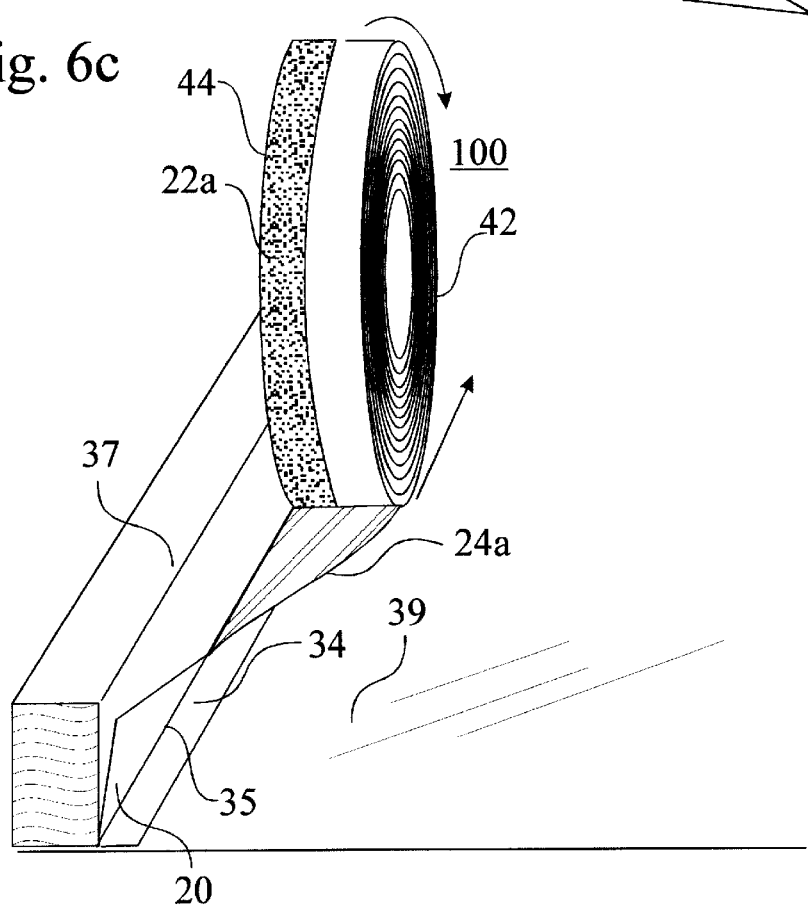
Figure 6D:
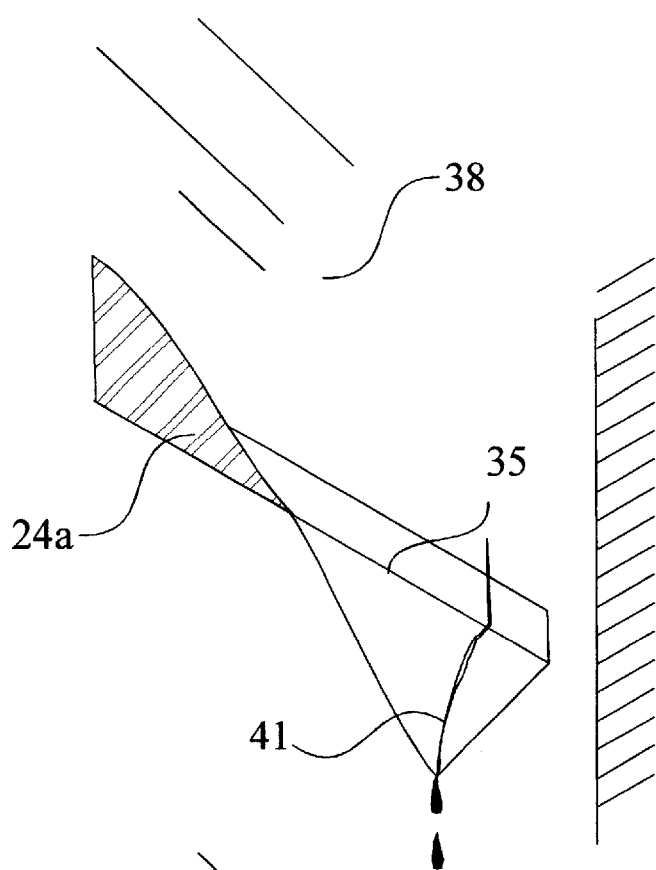

FIG. 6c shows the masking tape with outward pleat unwound, unfolded and bonded to corner of a printing screen and a screen frame FIG. 6d shows the masking tape with outward pleat folded to guide the leaking matter out from the surface.

Figure 6E:
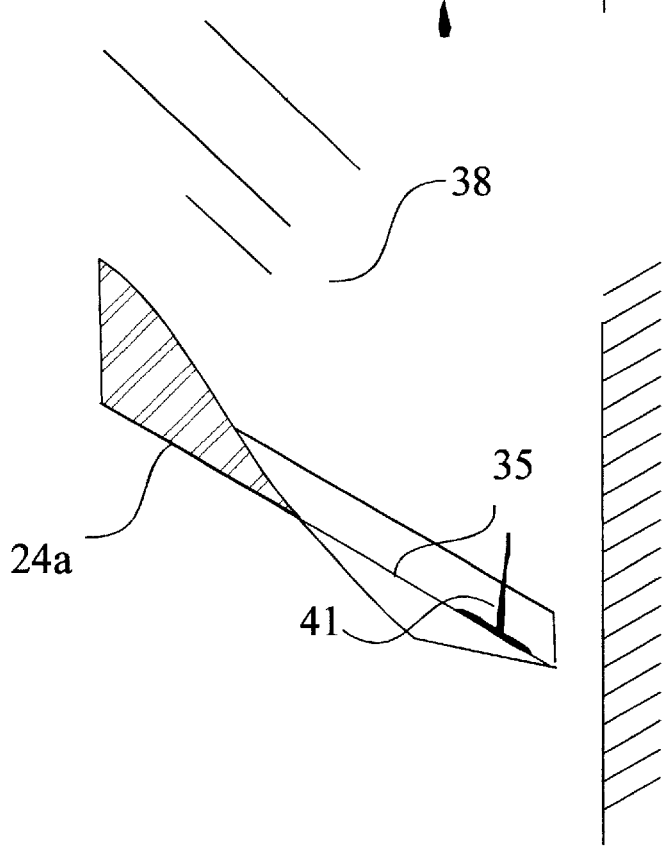

FIG. 6e shows the masking tape with outward pleat folded to collect the leaking matter.

Figure 7A:
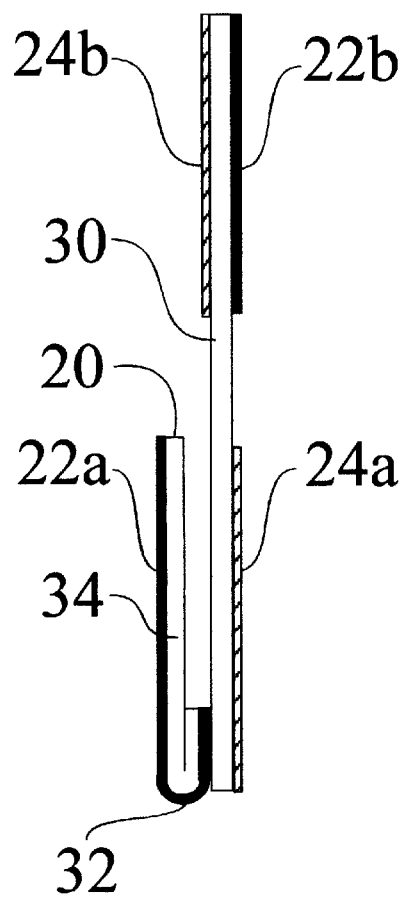
Figure 7B:
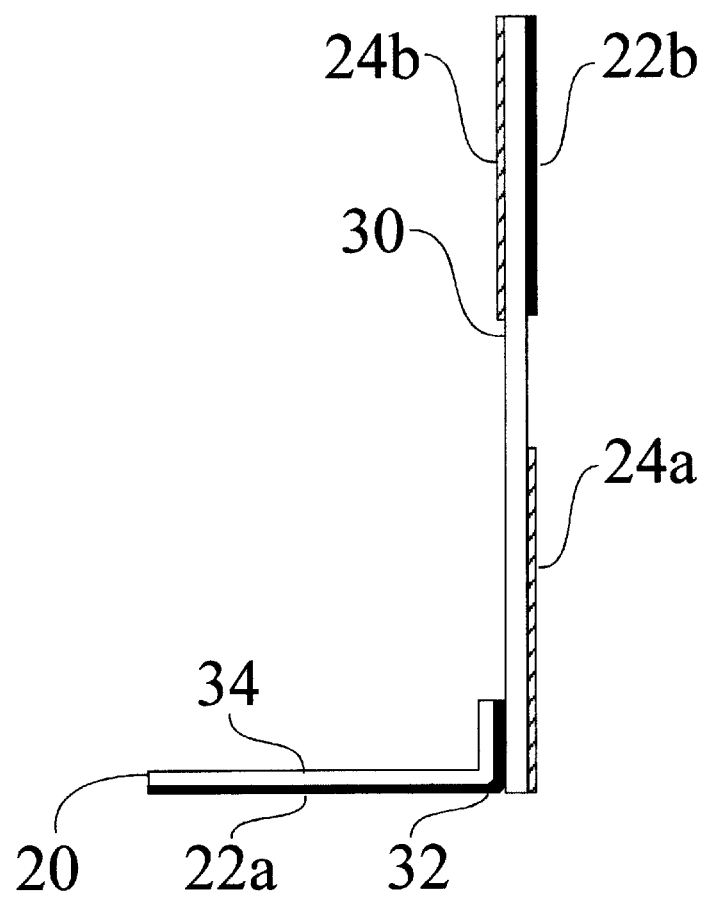

FIGS. 7a–b shows the cross sectional view of the folded tape with separate masking board a) as folded on a roll b) as unfolded against the working surface.

Figure 8A:
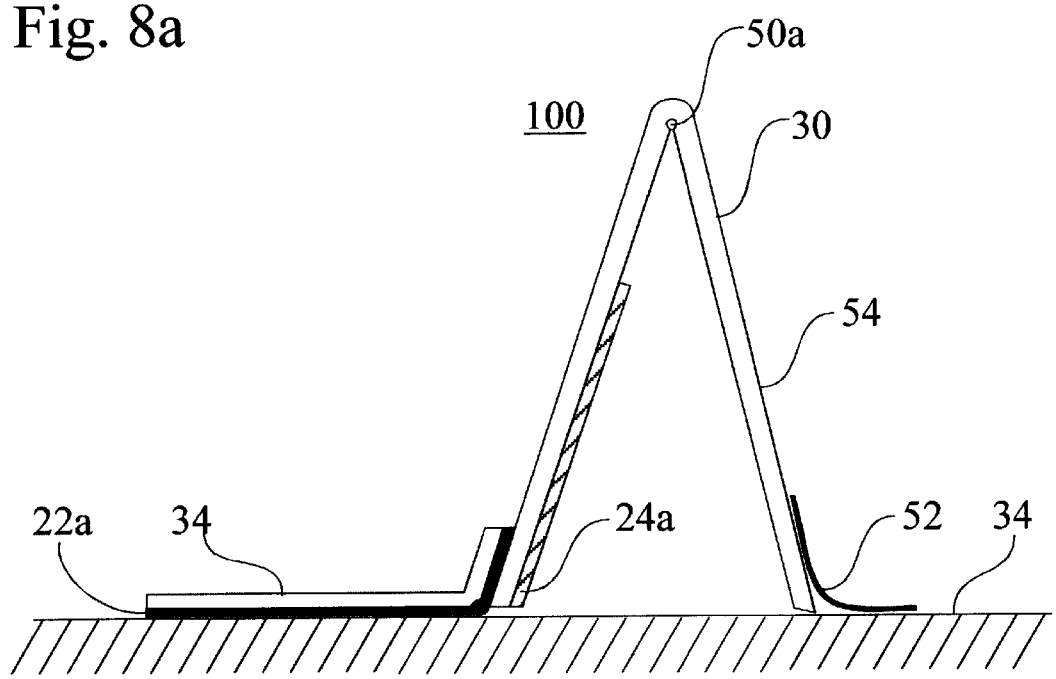

FIG. 8a shows a cross sectional view of the masking tape fixed on a surface and the masking strip folded up to provide a three dimensional guide.

Figure 8B:
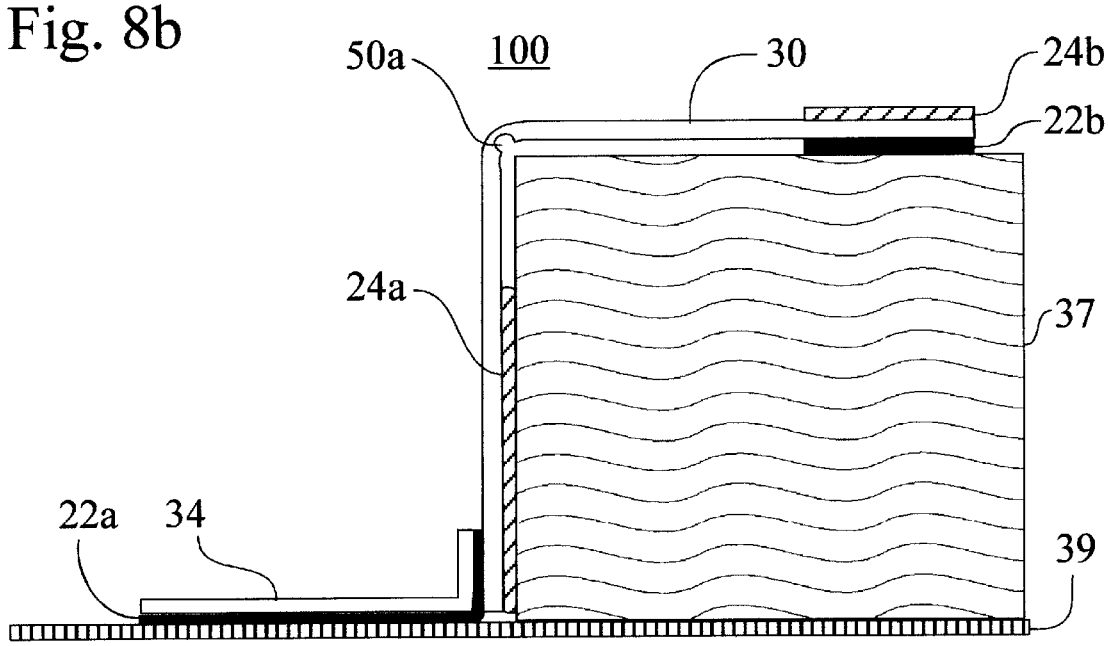

FIG. 8b shows a cross sectional view of the masking tape with masking strip fixed to the screen and the strip folded over a screen frame and additional pressure sensitive adhesive layer fixed to the screen frame.

Figure 10:
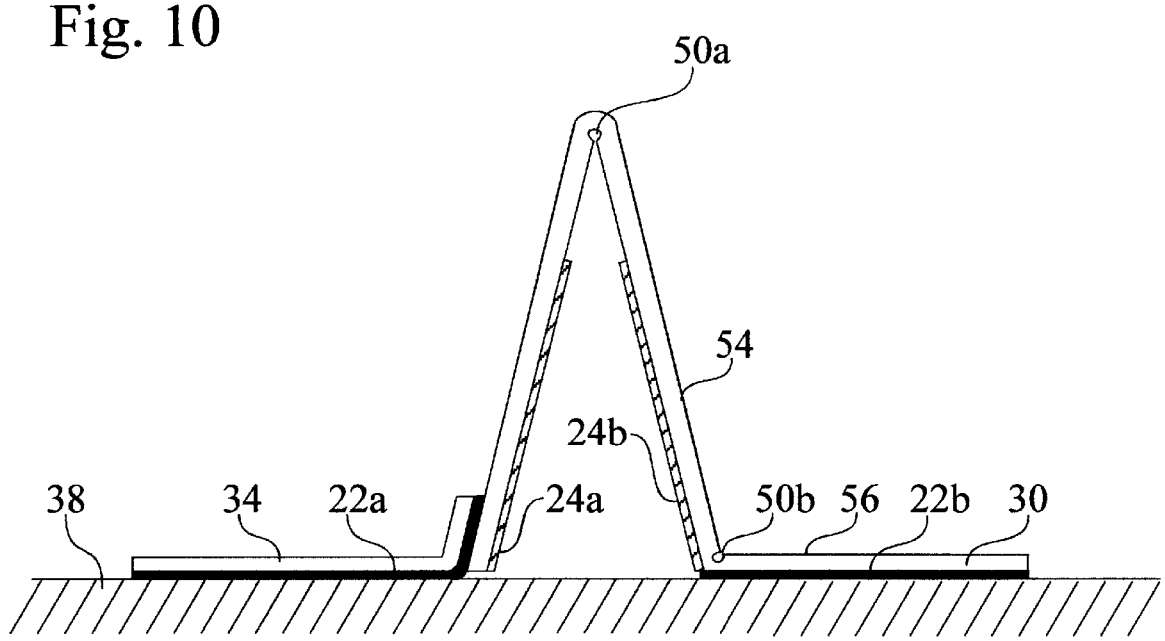
Figure 11D:
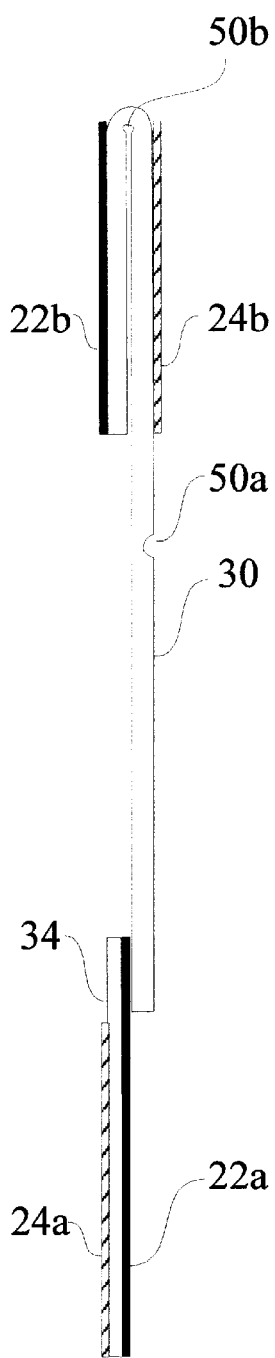
Figure 11E:
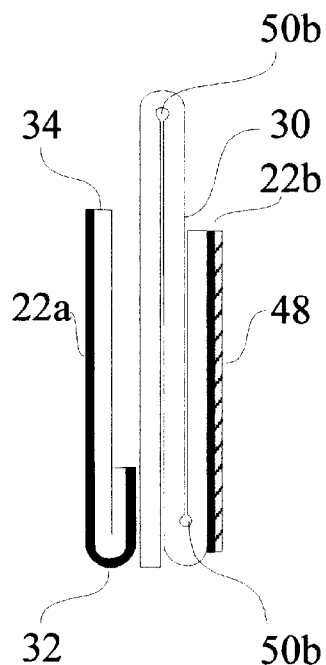
Figure 11F:
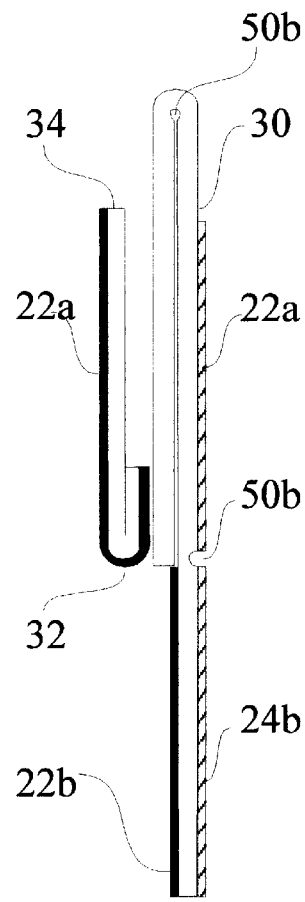

FIGS. 9a–d shows optional ways to fold the tape of FIG. 8 before winding the tape on a roll FIG. 10 shows a cross sectional view of the fifth embodiment with a support fold and a antislipping fold folded outward.

FIGS. 11a–f shows optional ways to fold the tape of FIG. 10 before winding the tape on a roll.

Figure 12:
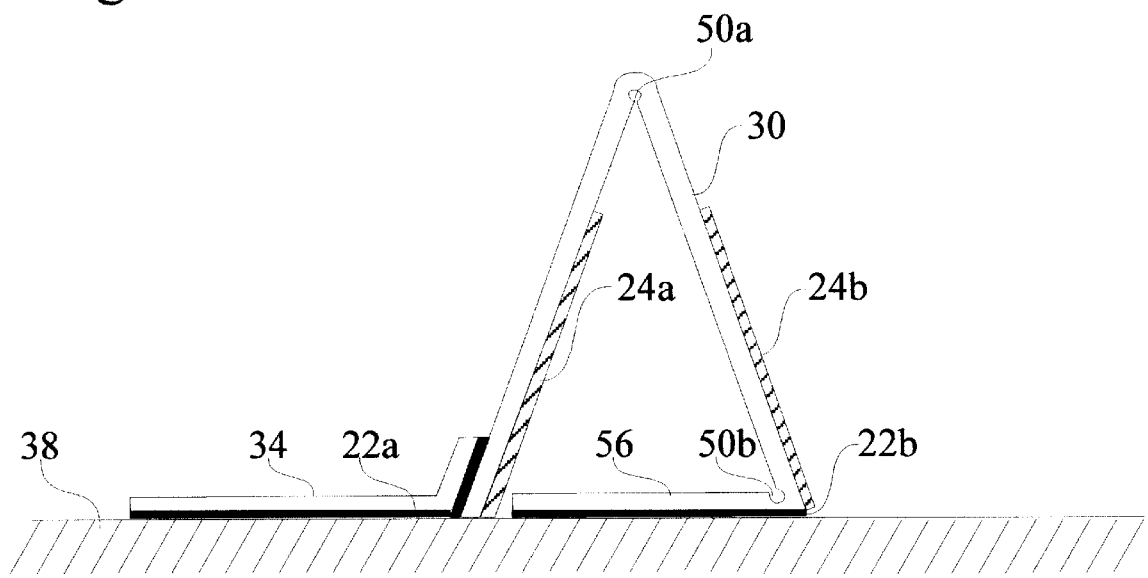
Figure 13A:
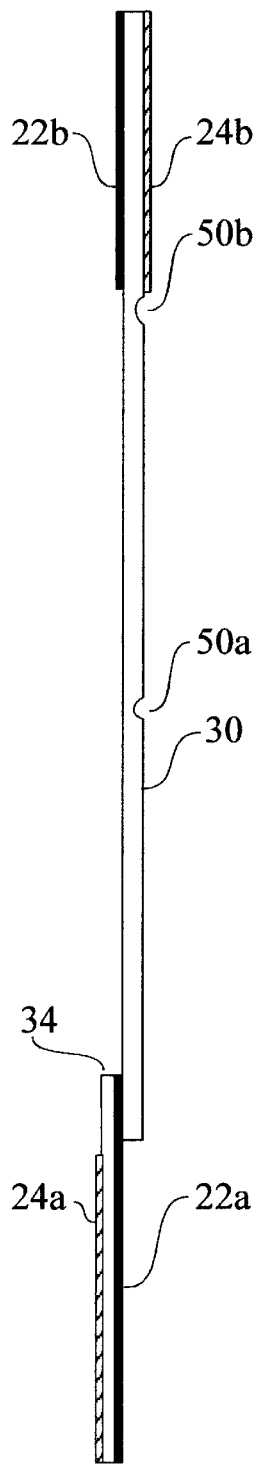
Figure 13B:
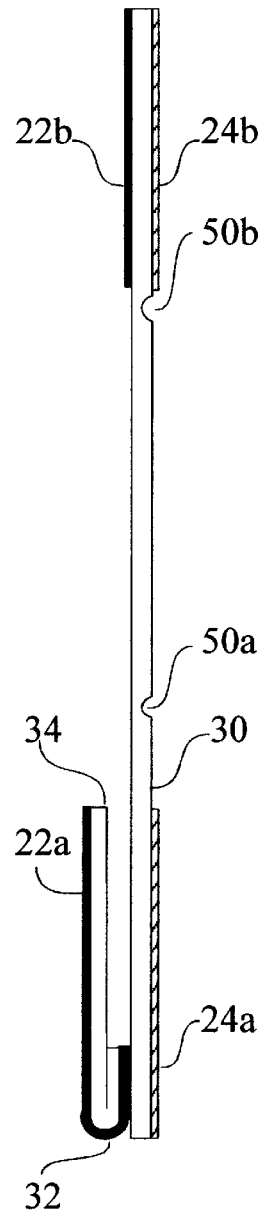
Figure 13C:
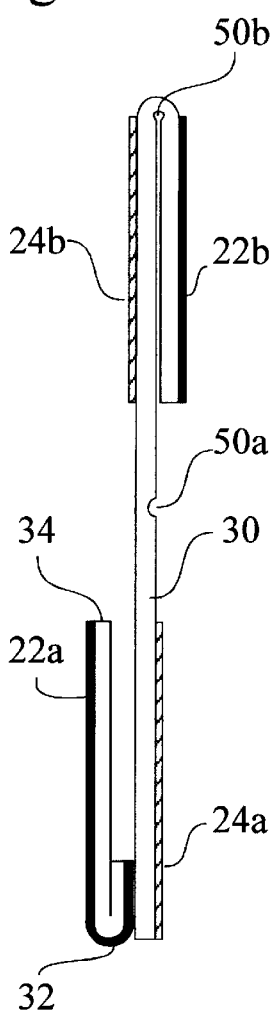
Figure 13D:
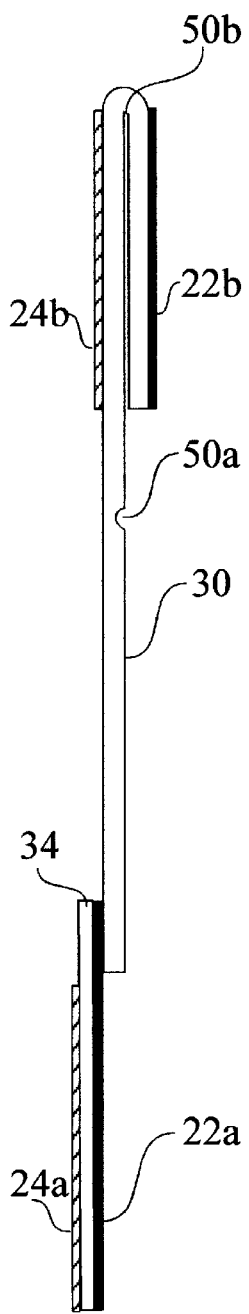
Figure 13E:
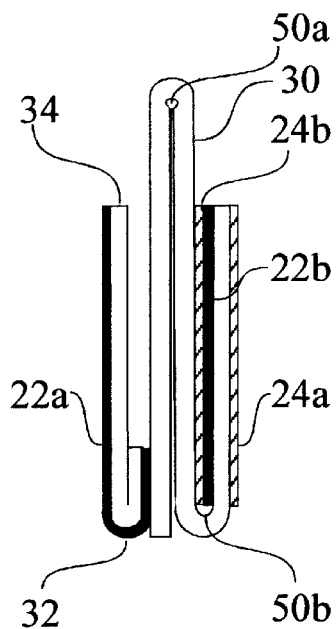
Figure 13F:
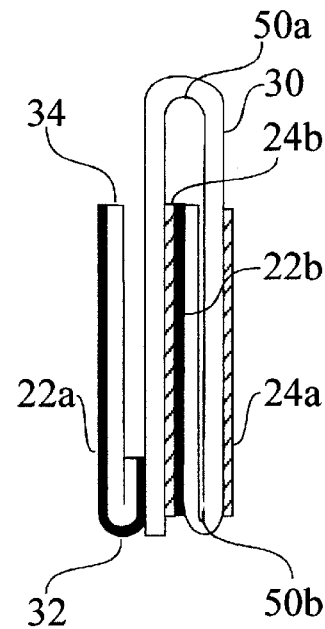
Figure 13G:
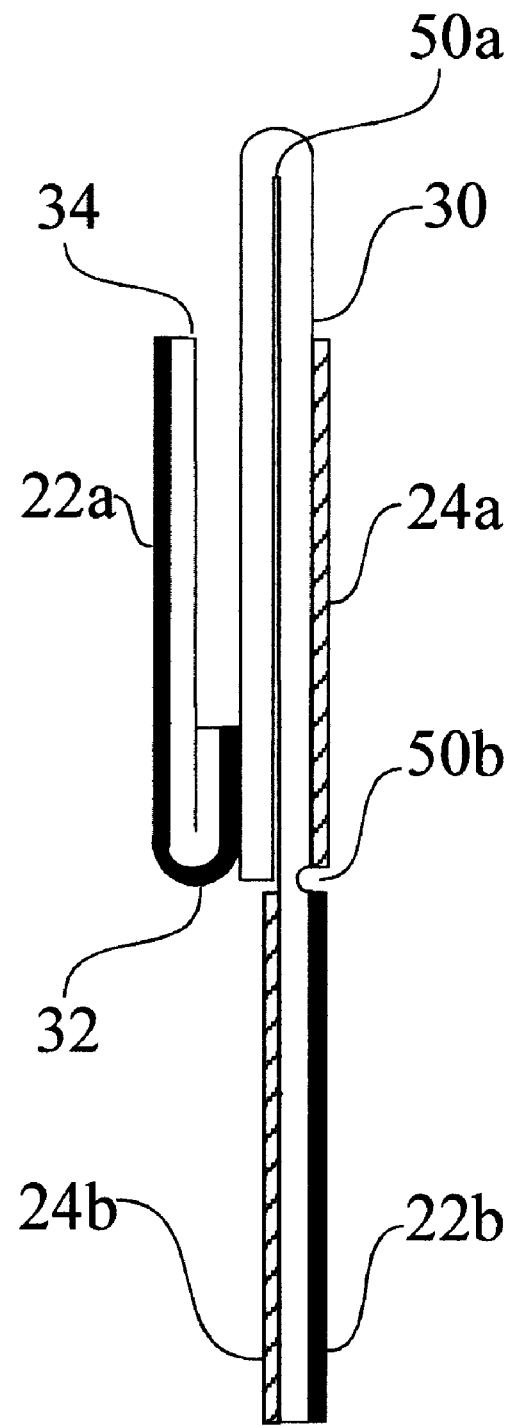

FIG. 12 shows a cross sectional view of the sixth embodiment with a support fold and an antislipping fold folded inward.

FIGS. 13a–g shows optional ways to fold the tape of FIG. 12 before winding the tape on a roll.

Figure 14A:
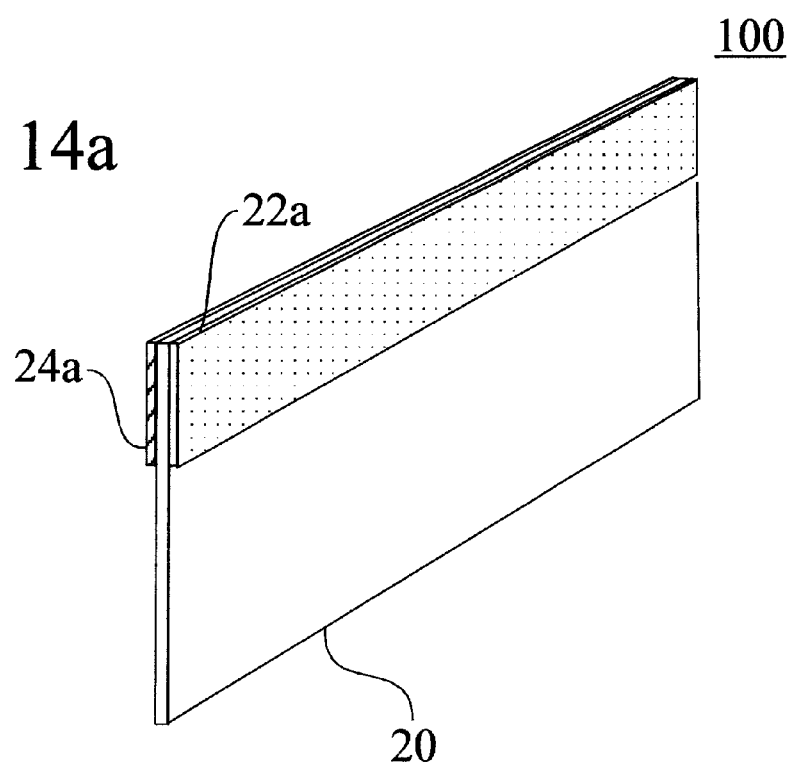

FIG. 14a shows an elevational view of a masking tape having a pressure sensitive adhesive on a margin.

Figure 14B:
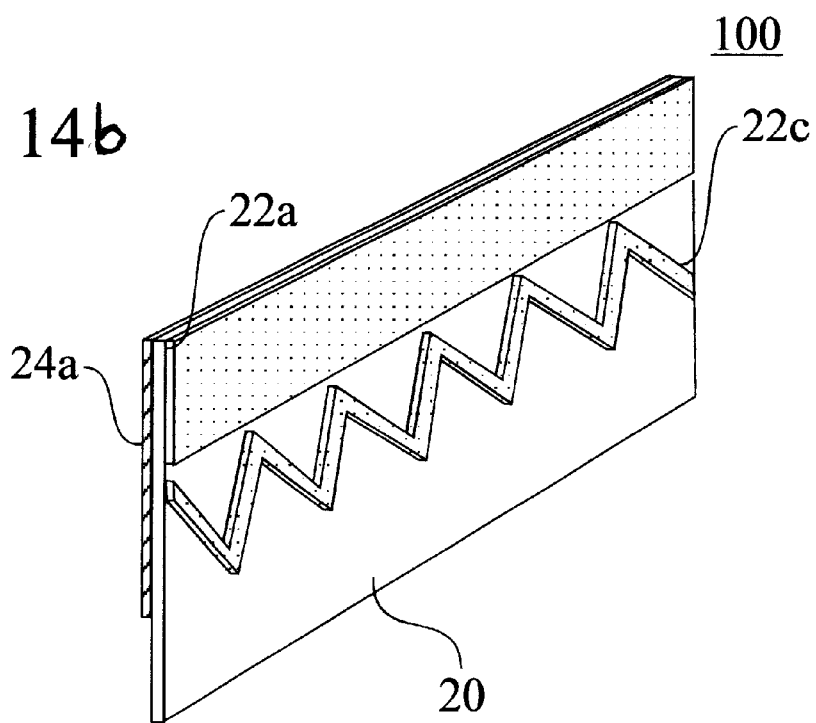

FIG. 14b shows an elevational view of a masking tape having a pressure sensitive adhesive on a margin and a easy release pressure sensitive adhesive are next to it.

FIGS. 15a–15d show a method to use the tape shown in FIGS. 14a and 14b.

FIG. 16a show a cross sectional view of a tape having a wider backing layer with margins overlapping both sides of a longitudinally running strip FIG. 16b show a cross sectional view of the tape of FIG. 16a having both overlapping margins turned in forming folds with adhesive layer facing out.

FIG. 16c show a cross sectional view of the tape of FIG. 16a bonded to a corner.

FIG. 16d show a cross sectional view of the tape of FIG. 16a bonded over a screen frame.

FIG. 16e show a cross sectional view of a tape having a wider backing layer with margins overlapping both sides of a longitudinally running strip and having a pre-formed, longitudinally running crease in predetermined position along which the strip can be folded double upon itself to form a pleat with generally planar folds that can be positioned to form a V-shape in use.

Figure 17A:
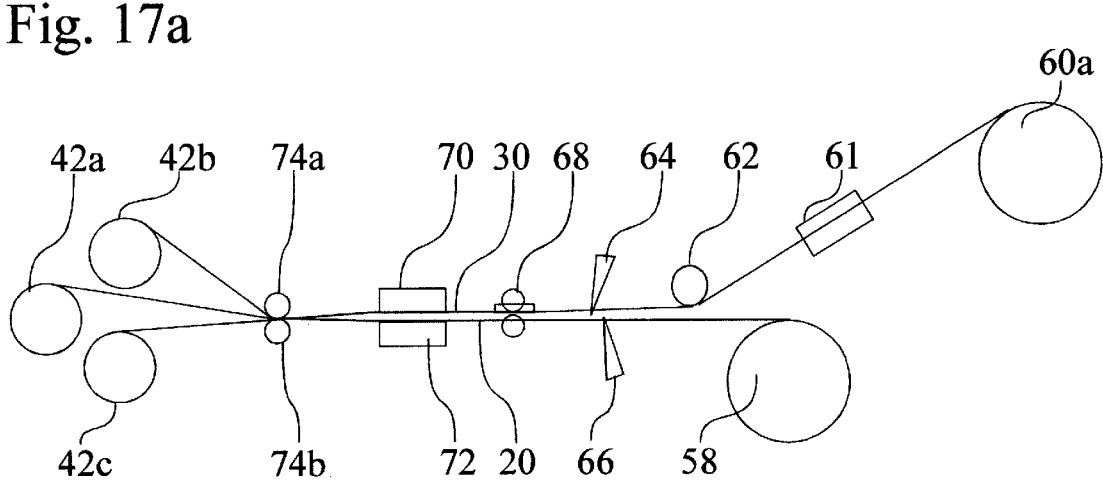

FIG. 17a shows a method of manufacturing the tape.

Figure 17B:
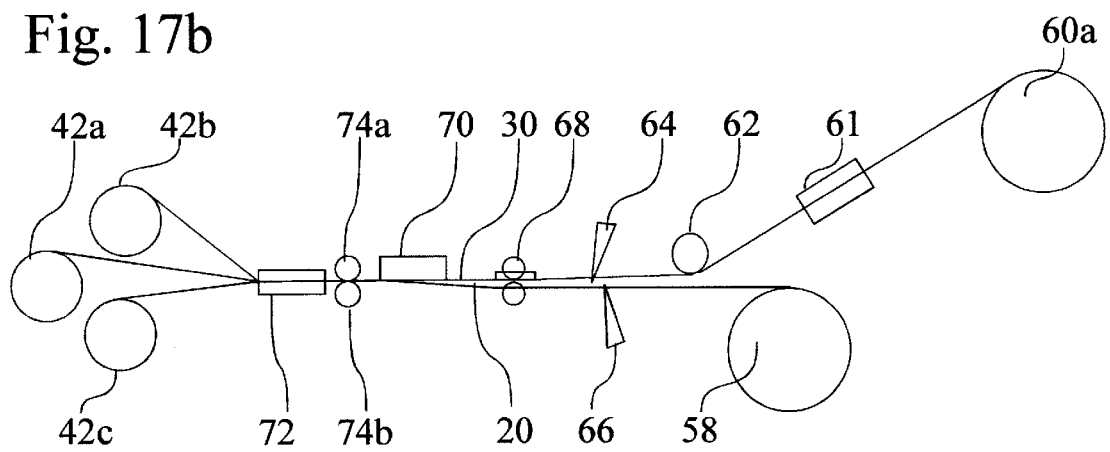

FIG. 17b show a method of manufacturing the tape.

DESCRIPTION OF THE FIRST EMBODIMENT

Figure 1:
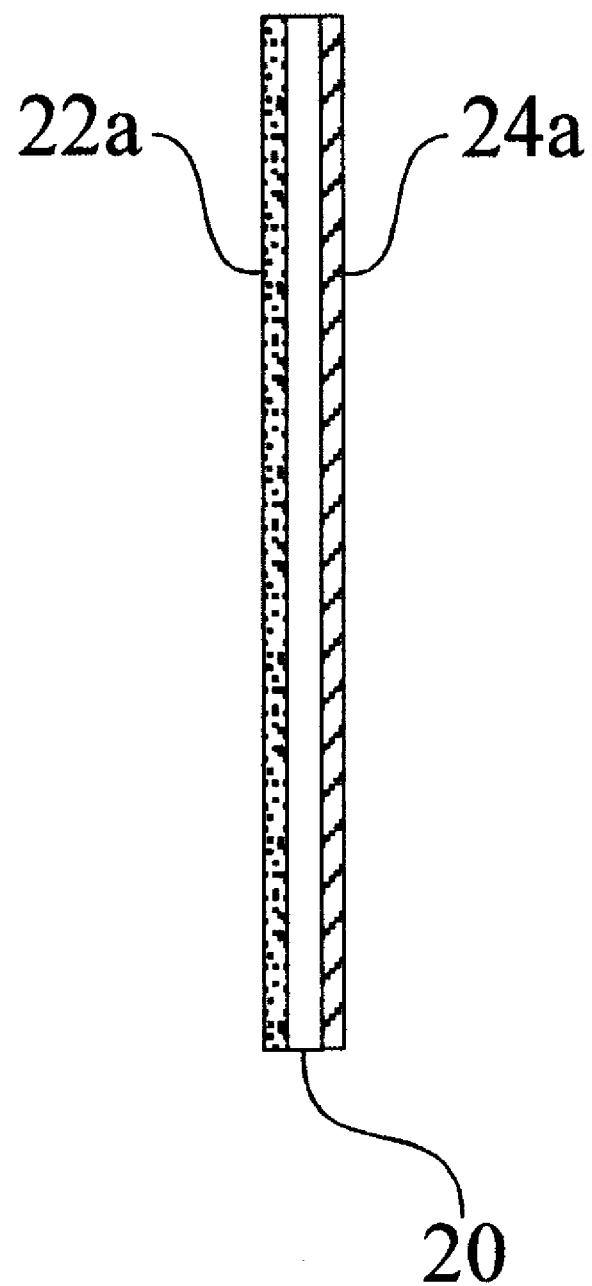
FIG. 1 shows a cross sectional view of the first embodiment of the tape.

FIG. 1 shows a cross sectional view of the masking tape. The elongated strip of tape backing 20 has a predetermined width, substantially wide enough to mask the marginal surface portion of the object which is not to be painted or other way treated. The tape backing 20 has a pressure sensitive adhesive 22 covering a first surface and an antistick coating 24a covering a second surface providing an easy release from a roll.

Figure 2:
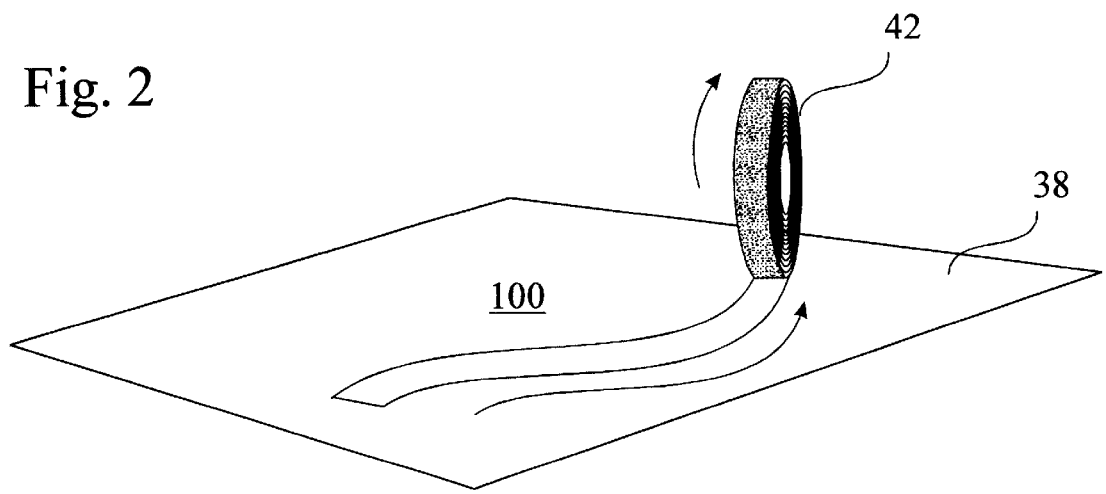
FIG. 2 shows a method of dispensing a curved line of the masking tape.

In FIG. 2 the masking tape is rolled on a roll 42 the adhesive surface facing out. Tape can be unwound and applied by pressing the outer rim of the tape roll 46 against the working surface, bonding the pressure sensitive adhesive against the working surface and rolling the tape out along the working surface.

Tape can be applied to irregular curvatures and contours by providing the tape with a flexible backing layer. Irregular curvatures are masked by rolling the tape out along the edge of a predetermined irregular line as shown in FIG. 2. Making one type of flexible backing layer is described in U.S. Pat. No. 5,464,692 for Mortimer J. Huber.

Figure 3:
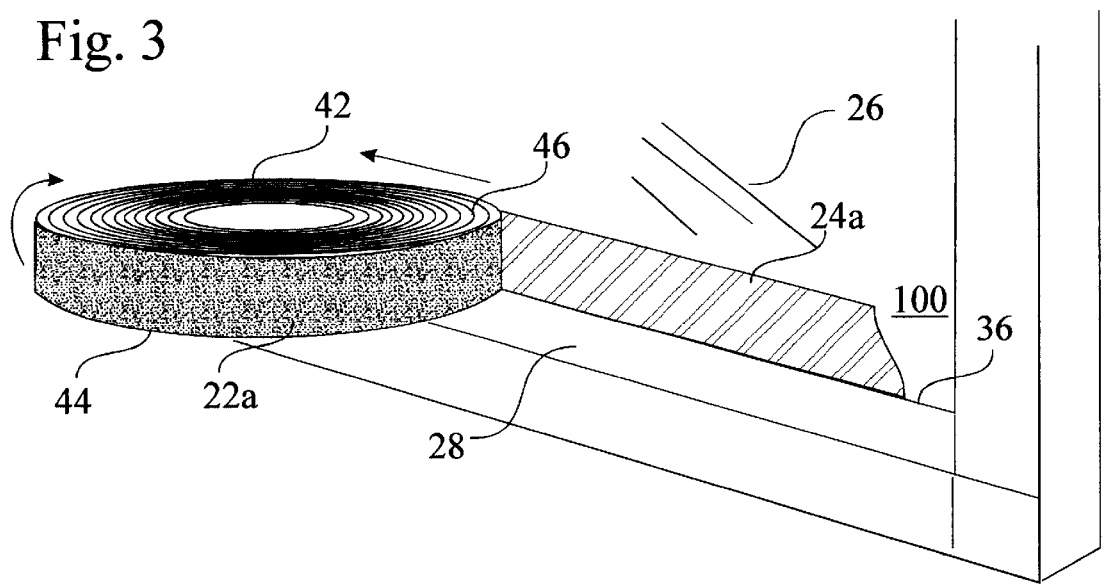
FIG. 3 shows a method of dispensing the tape along a corner.

In FIG. 3 window 26 is masked accurately by placing the side of the tape roll 44 against a window frame 28 and pressing the outer rim of the tape roll against the window 26. Pressure bonds the adhesive 22a to the window. The side 44 of the tape roll is guided and supported against the window frame 28 and tape 100 is simultaneously unwound along the window. The outer longitudinal periphery of the tape 100 accurately follows the corner 36. By having the pressure sensitive adhesive 22a on outer periphery of the tape roll, rolling the tape roll along the surface and applying the tape enables accurate masking in a fraction of the conventional working time. Term "periphery" refers to a line that forms the boundary of an area. Masking work can also be done accurately and quickly without prior experience. Corners, such as corner 36, shown in FIG. 3, are fast to mask with this new masking tape. The term "corner" is defined as the junction of two surfaces which meet and form an angle, preferably approximately 90 degrees, but other corners give sufficient support to the tape roll for easy masking.

Figure 4:
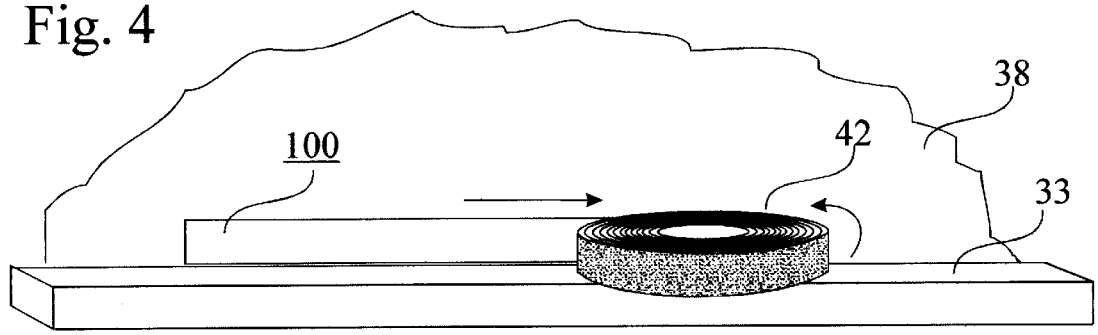
FIG. 4 shows a method of dispensing a straight line of the masking tape

FIG. 4 shows how a straight edge guide can be achieved on a working surface by supporting the side of the tape roll against a supportive elongated object 33. Straight mask lines can be applied quickly and without requiring any further intervention with this new method. The supportive object is held against the working surface and the outer rim of the tape roll is kept against the surface under pressure, the adhesive is bonded to the working surface 38 and tape is rolled out along the surface. The pressure of the tape roll bonds the adhesive against the working surface 38 and rolling motion releases the tape from the roll 42.

DESCRIPTION OF THE SECOND EMBODIMENT

FIGS. 5a, 5b and 5c show a second embodiment of the invention. Lower longitudinal margin 31 of the backing 20 of the tape is covered with pressure sensitive adhesive 22a. The margin 31 is folded backward doubling the backing layer upon itself. The margin 31 forms a longitudinally running pleat 34 and an edge 32. Term "edge" refers to a line of intersection of two surfaces oriented transverse to each other. The backing 20 of the tape is partially covered with release or antistick coating 24a which faces against the adhesive 22a when the tape is on a roll, enabling easy release (FIG. 5b). The upper margin of the backing 20 of the tape can have an optional additional second pressure sensitive adhesive layer 22b fixing the longitudinal edge of the tape 100 and an antistick coating 24b on the reverse side of the backing 20 of the tape. FIG. 5c shows the masking tape bonded to a corner 36.

FIG. 6a shows the masking tape 100 dispensed to the corner 36. The lower side 44 of the tape roll 42 is laid against the surface 38 and the outer rim of the tape roll is pushed against the opposite surface 40. The pleat 34 is unfolded and turned and pressed against the surface 38. The pressure sensitive adhesive 22a bonds the pleat 34 to the working surface 38. Upper part of the backing 20 of the tape is against the surface 40. The outermost, longitudinal peripheral line of the pleat 34 is on predetermined distance from the corner 36. The distance is depending on the width of the pleat 34.

FIG. 6b shows the masking tape 100 wound on a roll 42 with the pleat 34 facing out. The outer rim of the tape roll 42 is kept against the surface 38 under pressure, the adhesive 22a on the outer surface of the pleat 34 is bonded to the working surface 38 and tape is rolled out and dispensed along it. The pressure of the tape roll 42 bonds the adhesive against the working surface and rolling motion releases the tape from the roll 42. The backing 20 is unfolded as desired.

The unfolded backing 20 prevents leakage of a matter on the other side of the tape. On a vertical surface tape 100 guides the leakage 41 out of the surface (FIG. 6d) or collects the leakage 41 to a inner corner 35 (FIG. 6e).

This tape can also to be used to protect screen printing frames from ink during the printing process. The tape also prevents possible unexposed or uncovered screen mesh areas near the corner from leaking through the screen mesh. In screen printing the ink is on a planar screen defined by a screen frame. In order to protect the screen frame from ink printers usually use conventional tape. It takes a considerable amount of time to mask all four sides of the screen frame by using a conventional tape. The above described masking tape is convenient to handle and fast to fix.

FIG. 6c shows a tape described in FIG. 6b dispensed to a corner of a screen frame 37 and a planar screen mesh 39. The side 44 of the tape roll 42 is placed against the screen frame 37. Outer rim of the tape roll 42 is pushed against the screen mesh 39, adhesive 22a is bonded and the tape is rolled out along the screen mesh 39. Pressure sensitive adhesive 22a in the pleat 34 bonds the tape to the screen mesh 39. At the same time when the tape is unwound, the backing 20 of the tape is unfolded and turned against the screen frame 37. Printing ink is disposed on the mesh. The backing 20 protects the screen frames 37 from getting in the ink and adhesive 22a in pleat 34 secures the tape to the screen mesh.

In order to fix the upper longitudinal margin of the tape to the screen frame, tape can have an optional second pressure sensitive adhesive layer 22b (FIGS. 5a–5c). This layer should cover at least partially the tape on the screen frame side in order to keep the upper longitudinal periphery of the tape against the frame.

DESCRIPTION OF THE THIRD EMBODIMENT

FIGS. 7a and 7b show an alternative embodiment where the tape is partially made out of masking paper, preferably out of cardboard. Cellulose backing stiff, pressed cardboard is more economical and environmentally friendly than plastics. Cardboard is thicker and stiffer and keeps in form better than usually thinner and more flexible polymeric tape backing. Cardboard is also faster to apply to the corner and it keeps standing against the supporting surface.

FIG. 7a shows a folded masking tape having a cellulose backing strip 30. The backing 20 has a pressure sensitive adhesive layer 22a. The longitudinal margin of the tape 20 is bonded to the strip 30 by adhesive 22a. The tape 20 is folded backward upon the strip 30. Folding the tape forms a longitudinally running pleat 34 and an edge 32. The Tape has a adhesive layer 22a facing out from the center of the roll. Strip 30 has an antistick coating 24a facing the adhesive layer 22a when the tape is wound on a roll.

Tape can also have an optional pressure sensitive adhesive layer 22b to keep the upper peripheral edge of the masking tape 100 secured e.g. against the opposite surface of a corner. In a case the tape has an adhesive layer 22b, the masking strip 30 has a second antistick coating 24b preventing the adhesive layer 22b from fixing to the back of the masking strip 30 when the tape is on a roll.

DESCRIPTION OF THE FOURTH EMBODIMENT

FIG. 8a shows a further version of the masking tape shown in FIGS. 7a and 7b. The masking tape 100 is bonded to the surface 38 with pressure sensitive adhesive 22a. The strip 30 has a longitudinally running pre-formed crease 50a along which the longitudinally running peripheral edge of the strip 30 is folded against the surface 38.

Folding the edge creates a support pleat 54. The peripheral edge of the support pleat 54 is fixed to the surface 38 by piece of a conventional tape 52.

Folded strip 30 forms a three dimensional block for e.g. paint, ink or other liquid substance. Three dimensional tape can protect the surface from drops; guides a vertically leaking paint or other substance to a desired direction, collects liquid substance or restricts an area.

FIG. 8b shows the masking tape with a stiffener strip 30 folded over a screen frame 37.

FIGS. 9a–9c show different ways to fold the tape of FIGS. 8a and 8b before winding it on a roll

DESCRIPTION OF THE FIFTH EMBODIMENT

The masking tape is FIG. 10 is similar to the masking tape shown in FIG. 8 except that the support fold 54 has an additional pre-formed crease 50b along which the peripheral longitudinally running margin of the fold 54 can be folded outward. Crease 50b is performed on the opposite side than crease 50a. The new longitudinally running fold forms an antislipping fold 56. The antislipping fold 56 has a pressure sensitive adhesive layer 22b on the side which faces the surface 38 when the fold 56 is turned outward like shown in FIG. 10. Antislipping fold 56 is bonded to the surface 38 by pressure sensitive adhesive 22b. When the tape is on a roll the pressure sensitive adhesive 22b faces to the antistick coating 24b.

Masking tape can be wound to a dispensing roll either with the pressure sensitive adhesive 22a facing out or in. In preferred version the adhesive layer 22a faces out enabling dispensing by unwinding the roll against the working surface.

FIGS. 11b–11f show different ways to fold the tape in FIG. 10 before winding it to a roll. The position of the antistick coating varies depending the way the masking tape is folded.

DESCRIPTION OF THE SIXTH EMBODIMENT

The FIG. 12 shows a version of the masking tape having the antislipping fold 56 folded inward. Turning the tape inward forms a sturdy triangular structure blocking the inks, paints or other matter from escaping. This masking tape version has a pre-formed crease 50b on the same side as crease 50a. The pressure sensitive adhesive layer 22b is on the opposite side of the antislipping fold 56 than it is in FIG. 10.

FIGS. 13a–13g show different winding and fold configurations. Antistick coating 24 enables the release of the tape from a roll. Placement of the antistick coating depends on the way the tape is folded before winding it on a roll.

DESCRIPTION OF THE SEVENTH EMBODIMENT

FIG. 14a show a version of a masking tape which can be fixed to protect the surface and a masking paper can be added under the tape to provide additional wide area protection when e.g. spray paints are used.

The backing 20 has a pressure sensitive adhesive layer 22a covering first longitudinal margin of the tape and a antistick coating 24a on the other side of the backing layer 20 facing the adhesive 22a when the tape is on a roll.

Figure 15A:
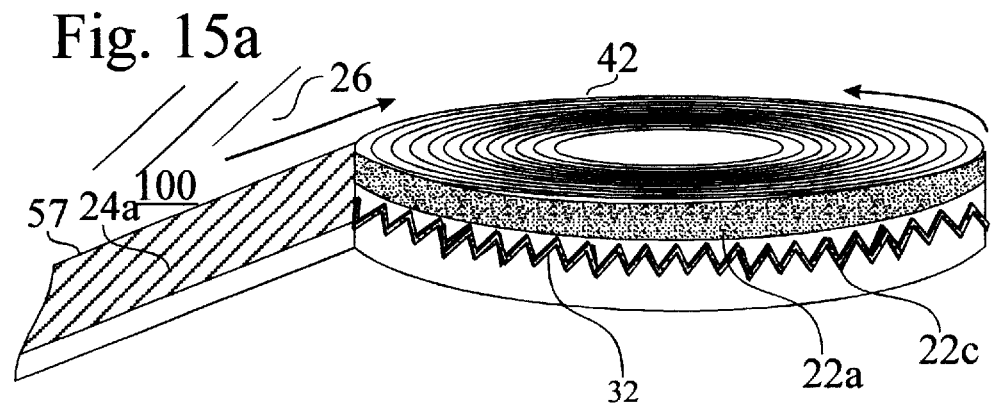
Figure 15B:
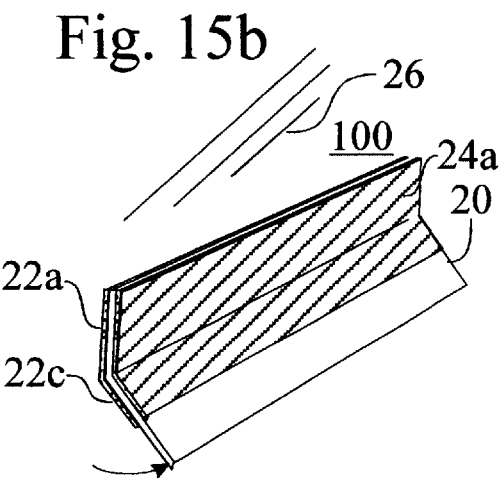
Figure 15C:
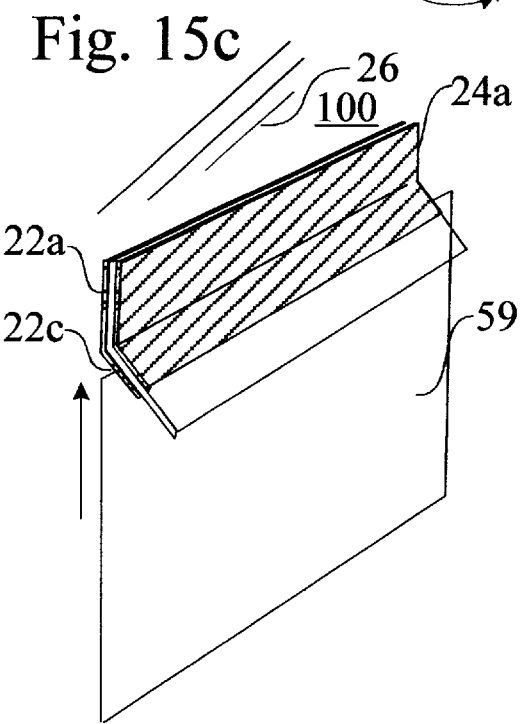
Figure 15D:
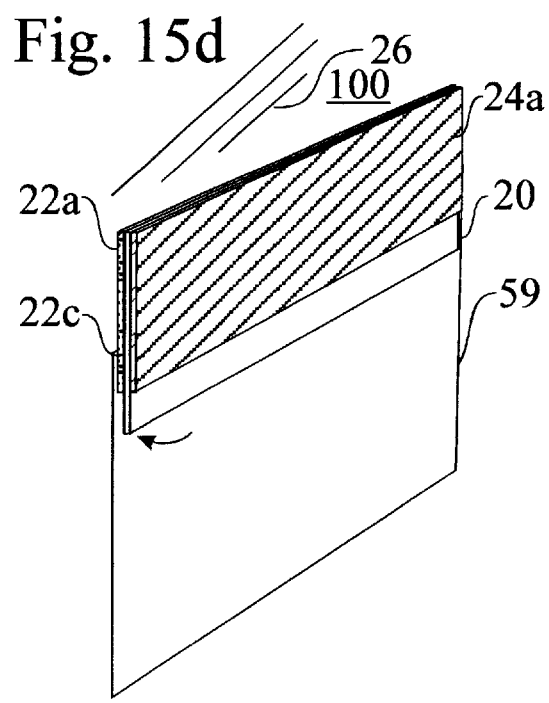

As shown in FIG. 14b the backing 20 can have an additional easy release pressure sensitive adhesive area 22c next to the adhesive 22a. Easy release adhesive 22c covers at least partially the area from the adhesive 22a covered margin to the other longitudinal edge of the tape. Easy release can be provided by partially depositing the same pressure sensitive adhesive as used for layer 22a. Also a lower tackier adhesive can be used to covering the area at least partially. A new method to use the tape is described in FIGS. 15a–15d. The tape is fixed first on a surface 26 as to provide a masking line 57 (FIG. 15a). The longitudinal margin with pressure sensitive adhesive in bonded to the surface 26. The opposite longitudinal margin is lifted up and the pressure sensitive adhesive layer 22a is partially unbonded and exposed or alternatively the easy release pressure sensitive adhesive area is exposed (FIG. 15b). An additional masking paper is placed between the surface 26 and pressure sensitive adhesive to provide wider cover of the surface (FIG. 15c). The additional masking paper is bonded to the masking tape 100 by pressing the pressure sensitive adhesive 22a or 22c against the masking paper. (FIG. 15d)

DESCRIPTION OF THE EIGHT EMBODIMENT

FIG. 17a shows an embodiment where the wider backing 20 overlaps both longitudinal margins of the strip 30. The tape does not have a possibly leaking joints between the backing 20 and the strip 30 since the backing covers all the surface of the tape.

The masking strip 30 does not need an additional second adhesive layer since the overlapping margins of the backing 20 bond both longitudinal peripheries of the tape to the working surface.

FIG. 17b shows a way to fold the overlapping margins of the backing layer. Both or either margins can be folded before winding the tape on a roll. Folded tape can be used similar way than tape shown in FIGS. 5a–5c, 6a–6e, 7a–7b and 8b. Tape can be wound on a roll either adhesive side facing out of the roll or adhesive facing in. Antistick coating 24a on the back side the strip 30 provides easy release for the adhesive of the tape from the roll.

If either one of the overlapping margins are not folded before winding on a roll the adhesive layer 22a faces the backing 20 when the tape is on a roll. Opposite side of the backing having no adhesive provides also an antistick or easy release coating, which it was given before winding the tape on a master roll. The same coating provides release for the unfolded margin. (in general, coating is not shown in figures).

FIG. 16c shows how to bond the tape to the corner of working surfaces like in FIGS. 5c, 6a, 6c. Same methods can be used than with previous embodiments.

FIG. 16d shows the tape bonded over a screen frame like in FIG. 8b

FIG. 16e shows a structurally similar tape as in FIG. 8a where the strip 30 has a pre-formed crease 50, along which the tape can be folded double upon itself to form a pleat with generally planar first and second regions that can be positioned to form a V-shape in use.

Tape in FIG. 16e works same way than the tape in FIG. 10. It can be bonded to the surface 38 from both longitudinal margins by the adhesive 22a.

CONCLUSION, RAMIFICATIONS AND SCOPE

The backing of the tape is available from most commercial manufacturers like 3M, Armac or American tape. The components of the laminated and unlaminated masking paper or cardboard are available from many different sources.

Several different materials for backing 20 can be used depending the application where the tape is used.

A representative, non-limiting list of useful backing materials includes;

paper with smooth or cropped side;

treated, untreated or surface coated fabric like cotton cellulose, polyamide or fiberglass;

films like soft PVC, hard PVC, hydrated cellulose, polyester, polypropylene (PP), polyethylene (PE), polyamide and aluminum;

foams like polyurethane, polyethylene, PVC and ethylene-propylene diene monomer (EPDM);

fleece and;

different laminates comprising two or more material to archive better overall characteristics.

Many different types of adhesives can be used. Materials are dependent upon the environmental conditions in which they are being used.

Synthetic and natural rubber based pressure sensitive adhesives provide a good adhesion upon contact, easy peel-off and good adhesion on critical substrates such as polypropylene or polyethylene.

Acrylics are available in solvents or water based dispersions. Pure and modified acrylic based pressure sensitive adhesives have excellent low and high temperature performance. Acrylics are resistance to aging, UV-radiation and chemicals. Acrylics provide a consistent release tension, they have excellent clarity and provide a clear, non yellowish background for printing.

Silicone adhesives provide a good resistance to heat and aging. Thermoplastics are solvent free environmentally friendly synthetic resins.

The properties of the adhesives are a function of their constituents. Although above mentioned adhesive types give a representative examples, also other types of pressure sensitive adhesive can be used.

MANUFACTURING THE TAPE

FIG. 17a shows a method of manufacturing a masking tape. The master tape is rolled out from the tape backing master roll 58 and the stiffener material is rolled out from a stiffener material master roll 60.

Optional second pressure sensitive adhesive layer and antistick layer is added to the stiffener material on spray station 61. Layer can be added by spraying or rolling or by using other method know in art. Spray station is not needed if needed adhesive or antistick layers are readily provided in stiffener material.

Guiding roll 62 feeds the masking cardboard into slicer 64, which slices the cardboard to longitudinal strips 30.

An optional creaser 68 presses a longitudinal crease to the cardboard. Crease is a thinner area along which the cardboard can be folded easily and accurately. After the creaser 68 strip folder 70 folds the masking strips 30 from desired position(s) forming parallel pleats. Simultaneously the tape from master tape roll 58 is cut to desired widths in slicer 66. The backings of the tape 20 are folded in folder 72.

The backing 20 and the masking strip 30 are combined between presser rolls 74a and 74b. Presser rolls 74 press the margins of the tape 20 and the margins of the strips 30 by using the pressure sensitive adhesive layer of the tape 20.

After joining the backing 20 and the masking strip 30 the tape is wound to rolls 76 to be used.

FIG. 17b shows an alternative method to make a masking tape. The process is otherwise similar to the process described in FIG. 16a, but the tape backing folder 72 is placed behind the presser rolls 74. In this alternative process the tape 20 is folded after it is bonded to masking strips 30. In some cases the tape 20 is easier to fold and less jamming occurs when it is joined to the stiffer masking strip 30 before it is folded.

LIST OF REFERENCE NUMERALS

20 backing of the tape
22a first pressure sensitive adhesive layer
22b second pressure sensitive adhesive layer
22c easy release pressure sensitive adhesive layer
24a release or antistick coating
24b release or antistick coating
26 window
28 window frame
30 masking strip
31 longitudinal margin
33 elongated object
32 edge
34 pleat
35 corner of the tape
36 corner of working surfaces
37 screen frame
38 working surface
39 screen mesh
40 second working surface
41 leakage
42 tape roll
44 lower side of the tape roll
46 upper side of the tape roll
48 peel-off outermost layer with release or antistick coating
50a pre-formed crease
50b pre-formed crease
52 conventional tape
54 support fold
56 atislipping fold
57 masking line
58 tape backing master roll
59 masking paper
60 stiffener material master roll 61 spray stations
62 guiding roll
64 tape backing slicer
66 stiffener materil slicer
68 creaser
70 strip folder
72 tape backing folder
74 presser rolls
100 masking tape

I claim:

1. A roll of masking tape having a predetermined width and being suitable to mask a surface comprising:
   a) an elongated backing layer having first and second major surfaces;
   b) said first surface having as an outermost layer a pressure sensitive adhesive covering said first side at least partially;
   c) said second surface of said backing layer having thereon an anti-stick coating, covering said first side at least partially, providing an easy release of said pressure sensitive adhesive; and
   said masking tape being wound on a roll wherein said pressure sensitive adhesive layer faces outward from a center of the roll enabling said tape to be applied on a surface by pressing a outer rim of said roll against said surface as the roll is unwound, bonding said pressure sensitive adhesive layer with the surface and unwinding said tape out of said roll along said surface.

2. The masking tape of claim 1 having said elongated backing layer being folded double upon itself of predetermined width against said second surface of said backing layer from a first longitudinal peripheral edge, forming
   a longitudinally running pleat, said pressure sensitive adhesive covering a outermost surface of said pleat;
   b) said first surface of said backing layer surface having thereon an anti-stick coating, covering said first side at least partially, providing an easy release of said pressure sensitive adhesive of said first peripheral edge when the tape is wound on a roll;
   said masking tape being wound on a roll wherein said pressure sensitive adhesive layer faces outward from a center of the roll enabling said tape to be applied on a masked corner by pressing a outer rim of said roll against a first surface, bonding said first pressure sensitive adhesive layer with said first surface and unwinding said tape out of said roll along said surface, and unfolding said pleat against a second surface of said corner.

3. The masking tape of claim 2 being wound on a roll wherein said pressure sensitive adhesive layer faces inwards against the next convolution of said masking tape.

4. The roll of masking tape of claim 2 having
   a) a second pressure sensitive adhesive layer covering a second longitudinal peripheral edge of predetermined width of said first side of said backing layer at least partially;
   b) said second surface of said backing layer having a second anti-stick coating covering said second longitudinally running peripheral edge of predetermined width and facing said second pressure sensitive adhesive of said second peripheral edge on said first side of the backing layer when said tape is in a roll; and
   said masking tape being wound on a roll wherein said first pressure sensitive adhesive layer faces outward from a center of the roll enabling said tape to be applied on a masked corner by pressing a outer rim of said roll against a first surface, bonding said first pressure sensitive adhesive layer with said first surface and unwinding said tape out of said roll along said surface, unfolding said pleat and bonding said second pressure sensitive adhesive layer with a second surface of said corner.

5. The roll of masking tape of claim 1 wherein said elongated backing layer is being folded double upon itself of predetermined width against said second surface of said backing layer from a first longitudinal peripheral edge, forming a longitudinally running pleat;
   having an elongated stiffener strip with a predetermined width and a substantially higher stiffness than said backing layer and having a first and second major surfaces and a first and a second longitudinally running margins;
   at least a first longitudinal margin of a first major surface of said stiffener strip extending substantially to a longitudinal periphery of a second longitudinal margin of said backing layer, being bonded to a second longitudinal margin of said backing layer by said first pressure sensitive adhesive layer of said backing layer; and,
   a second major surface of said stiffener strip having thereon a first anti-stick coating, covering said second side of said backing layer at least partially, providing an easy release of said first pressure sensitive adhesive layer of said pleat when the tape is wound on a roll;
   said masking tape being wound on a roll wherein said first pressure sensitive adhesive layer faces outward from a center of the roll enabling said tape to be applied on a masked corner by pressing a outer rim of said roll against a first surface, bonding said first pressure sensitive adhesive layer with said first surface and unwinding said tape out of said roll along said face, and unfolding said pleat by lifting said stiffener strip up.

6. The masking tape of claim 5 wherein said stiffener strip has predetermined quantity of pre-formed, relatively thin, longitudinally running creases on first and second major surface in predetermined positions enabling folding of said stiffener strip to a desired three-dimensional position on a working surface.

7. The masking tape of claim 6 wherein said stiffener strip has a second pressure sensitive adhesive layer covering said second longitudinal margin of said second side of said stiffener strip at least partially, and a second longitudinal margin of said first side of said stiffener strip having thereon an anti-stick coating, covering said first side of said stiffener strip at least partially, providing an easy release of said pressure sensitive adhesive of said second pressure sensitive adhesive layer when the tape is wound on a roll.

8. The masking tape of claim 6, wherein said stiffener strip has a first longitudinally running crease on said second surface of said stiffener strip substantially closer to said first longitudinally running margin than said second longitudinally running margin and a second longitudinally running crease on said first surface of said stiffener strip substantially closer to said second longitudinally running margin than said first longitudinally running margin, said creases dividing said stiffener strip to a first, a second and a third generally planar regions and enabling folding of said stiffener strip to a three-dimensional position on a working surface, said first and said second regions forming an A-shape and said third generally planar region being able to be mounted parallel to said working surface and having a second pressure sensitive adhesive layer covering said second longitudinal margin of said second side of said stiffener strip for bonding said third region to said working surface away from said first and second regions.

9. The masking tape of claim 6 wherein said stiffener strip has a first longitudinally running crease on said second surface of said stiffener strip substantially closer to said first longitudinally running margin than said second longitudinally running margin and a second longitudinally running crease on said second surface of said stiffener strip substantially closer to said second longitudinally running margin than said first longitudinally running margin, said creases dividing said stiffener strip to a first, a second and a third generally planar regions and enabling folding of said stiffener strip to a three-dimensional position on a working surface, said first and said second regions forming an A-shape and said third generally planar region being parallel to said working surface and having a second pressure sensitive adhesive layer covering said second longitudinal margin of said first side of said stiffener strip for bonding said third region to said working surface inward toward said first regions, said three regions forming a triangle shape.

10. The masking tape of claim 5, wherein said stiffener is longitudinally bonded to said backing layer by said pressure sensitive adhesive; said backing layer being wider than said stiffener strip so that a first and a second longitudinal margins of said backing layer overlap said stiffener strip.

11. The masking tape of claim 10 wherein at least one of said overlapping margin is folded double upon itself against said second surface of said backing layer forming a pleat having said pressure sensitive adhesive facing out and said stiffener strip having said anti-stick coating covering said second surface at least partially facing said pressure sensitive adhesive of said folded margin when said tape is on a roll; said masking tape being wound on a roll wherein said pressure sensitive adhesive faces outward from the center of the roll.

12. The masking tape of claim 11 being wound on a roll wherein said pressure sensitive adhesive also faces inwards against the next convolution of said masking tape.

13. The masking tape of claim 10 wherein said stiffener strip has a pre-formed, longitudinally running crease in predetermined position along which said strip can be folded upon itself with generally planar first and second regions that can be positioned to form a three-dimensional shape in use.

14. A masking tape of claim 1 wherein said anti-stick coating of said second surface is integral with a backing layer forming an anti-stick surface.

15. The masking tape of claim 1 wherein said first surface has as an outermost layer a pressure sensitive adhesive covering a first longitudinal peripheral edge of predetermined width and a second layer of pressure sensitive adhesive at least partially covering the rest of said first surface so as to provide a relatively easier releasing area compared to said first mentioned adhesive, providing a longitudinally running edge which can be released from a working surface, enabling a masking paper to be placed between said second adhesive and said working surface and enabling said masking paper to be bonded to said second adhesive by pressing said second pressure sensitive adhesive against said masking paper, said masking tape being wound on a roll wherein said pressure sensitive adhesive layer faces outward from a center of the roll enabling said tape to be applied on a masked surface by pressing an outer rim of said roll against said surface, bonding said pressure sensitive adhesive layer with the surface and unwinding said tape out of said roll along said surface.

16. The masking tape of claim 4 wherein said second pressure sensitive adhesive layer faces outward from said center of the roll.

17. The masking tape of claim 7 wherein said second pressure sensitive adhesive layer faces outward from said center of the roll.

18. The masking tape of claim 7 wherein said stiffener strip has predetermined quantity of pre-formed longitudinally running creases on first and second major surface in predetermined positions enabling folding of said stiffener strip to a desired three-dimensional position on a working surface.

19. A method of applying a masking tape having a predetermined width and being suitable to mask a surface comprising:

a) an elongated backing layer having first and second major surfaces;

b) said first surface having as an outermost layer a pressure sensitive adhesive covering said first side at least partially;

c) said second surface of said backing layer having thereon an anti-stick coating, covering said first side at least partially, providing an easy release of said pressure sensitive adhesive; and said masking tape being wound on a roll wherein said pressure sensitive adhesive layer faces outward from a center of the roll on a inner corner of two surfaces by supporting a side of said roll against a first surface of a corner and by pressing a outer rim of said roll against a second surface; bonding said pressure sensitive adhesive to said second surface and unwinding the tape along said second surface while simultaneously guiding said side of said roll against said first surface.

* * * * *